Feb. 9, 1937.  J. SENFT  2,070,187
TIRE CHAIN
Filed Dec. 13, 1935
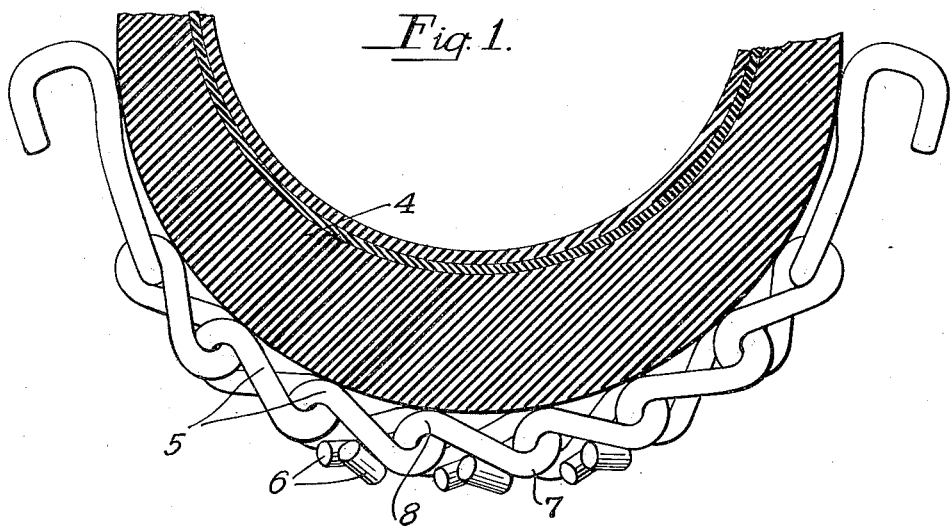
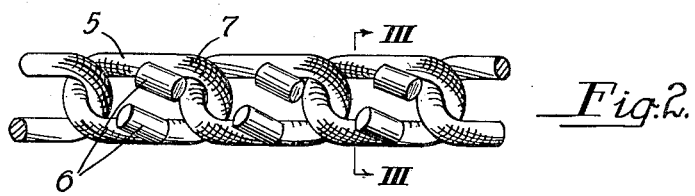
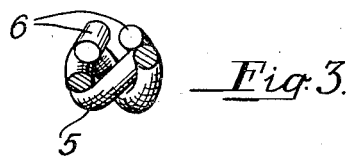
INVENTOR
John Senft,
By Archworth Martin,
Attorney.

Patented Feb. 9, 1937

2,070,187

UNITED STATES PATENT OFFICE 2,070,187

TIRE CHAIN

John Senft, York, Pa., assignor to The McKay Company, Pittsburgh, Pa., a corporation of Pennsylvania Application December 13, 1935, Serial No. 54,247

1 Claim. (Cl. 152—14)

My invention relates to chains such as are more particularly employed in connection with automobile wheels and commonly termed "anti-skid chains".

One object of my invention is to provide a chain which is better resistant to skidding and has greater resistance to wear than various types of chains heretofore employed.

Another object of my invention is to provide a tire chain having calks or reinforcing bars of such form and so positioned that the chain links will have great resistance to wear and increased life, even though the calks are not placed directly upon the outermost surfaces of the links.

Still another object of my invention is to provide a calk link chain of such form that there is little danger of the links becoming kinked or tangled with one another.

One form which my invention may take is shown in the accompanying drawing wherein Figure 1 is a sectional view showing a portion of an automobile tire with an anti-skid chain in place; Fig. 2 is an inverted plan view of the chain of Fig. 1, and Fig. 3 is a view taken on the line III—III of Fig. 2.

The drawing shows a cross chain disposed across the tread of a vehicle tire 4 in the usual manner. A suitable number of these chains will be provided, the ends thereof being connected to annular side chains as shown in my Patent No. 1,814,639, or the cross chains may constitute parts of what are commonly designated "unit chains", wherein the ends of the cross chains are connected by straps or the like, which extend around the felly of the wheel.

The cross chain is shown as comprising a suitable number of links 5 which are twisted in the usual manner so that the links can lie in substantially flatwise positions against the tread of the tire, and against the roadway. A suitable number of the links are provided with calks or reinforcing bars 6 which are welded in position thereon.

It will be seen that the calks 6 are welded to the links at points intermediate the protuberant bends 7 and the depressed portions 8 of the links. By this arrangement, the over-all thickness of the links is not so great as if the cake 6 were placed on the protuberant bends 7, and hence the chains are smoother in riding quality. On the other hand, the calks are placed sufficiently close to the bends 7 that they will be practically worn away before the links are worn through at 7, so that the life of the links is not materially lessened through placing of the calks at points lower than the bends 7.

Also, the calks and bends 7, particularly after slight wear of the chain, cooperate to give a wider area of metal for engagement with the road. The calks also are so positioned that their ends will resist skidding.

It is further to be noted that the calks 6 on each link are placed so closely together that the adjacent links cannot move between the calks, thereby preventing tangling of the links. In other words, the spacing between each pair of calks 6 is less than the diameter or thickness of the bar stock from which the bodies of the links are formed.

I claim as my invention:—

An anti-skid cross chain comprising interconnected links that are twisted adjacent to their ends so that they will be approximately in a common plane, and a pair of bar-like calks welded to each link at points adjacent to the protuberant bends thereof and diagonally disposed with respect to the longitudinal center line of the link, the calks of each link being spaced apart a distance less than the thickness of the metal from which the links are formed.

JOHN SENFT.